(12) United States Patent
Masuda

(10) Patent No.: US 12,691,606 B2
(45) Date of Patent: Jul. 28, 2026

(54) PRESSING DEVICE

(71) Applicant: ALPHASYSTEM CORPORATION, Ibaraki (JP)

(72) Inventor: Daizo Masuda, Ibaraki (JP)

(73) Assignee: ALPHASYSTEM CORPORATION, Ibaraki (JP)

( * ) Notice: Subject to any disclaimer, the term of this patent is extended or adjusted under 35 U.S.C. 154(b) by 77 days.

(21) Appl. No.: 18/687,798

(22) PCT Filed: Jul. 28, 2023

(86) PCT No.: PCT/JP2023/027868
§ 371 (c)(1),
(2) Date: Feb. 28, 2024

(87) PCT Pub. No.: WO2025/027719
PCT Pub. Date: Feb. 6, 2025

(65) Prior Publication Data
US 2025/0242520 A1 Jul. 31, 2025

(51) Int. Cl.
| | |
|---|---|
| *B28B 3/08* | (2006.01) |
| *B28B 17/00* | (2006.01) |
| *H01C 17/00* | (2006.01) |
| *H01G 13/00* | (2013.01) |
| *H01C 7/00* | (2006.01) |

(Continued)

(52) U.S. Cl.
CPC .......... *B28B 3/083* (2013.01); *B28B 17/0081* (2013.01); *H01C 17/00* (2013.01); *H01G 13/00* (2013.01); *H01C 7/003* (2013.01); *H01F 41/041* (2013.01); *H01G 4/30* (2013.01)

(58) Field of Classification Search
CPC .......... B28B 3/06; B21D 13/02; B21D 51/34; B31D 5/02; B44C 1/24; B22D 41/40; B22D 1/222; B29C 43/006; B29D 2030/0627; B21J 1/00; H01C 17/00; H01C 13/00; H01C 7/003; H01F 41/041; H01G 4/30
See application file for complete search history.

(56) References Cited

U.S. PATENT DOCUMENTS

| | | | | |
|---|---|---|---|---|
| 3,078,540 A | * | 2/1963 | Bush | ......................... B28B 3/08 |
| | | | | 425/352 |
| 4,909,061 A | | 3/1990 | Reitter et al. | |

(Continued)

FOREIGN PATENT DOCUMENTS

| | | |
|---|---|---|
| CN | 1655924 A | 8/2005 |
| CN | 101896325 A | 11/2010 |
| CN | 115007716 A | 9/2022 |

(Continued)

OTHER PUBLICATIONS

Office Action issued in TW Patent Application No. 112128598, dated Mar. 7, 2024.

(Continued)

*Primary Examiner* — Yung-Sheng M Tsui
*Assistant Examiner* — Melody Tsui
(74) *Attorney, Agent, or Firm* — MARSHALL, GERSTEIN & BORUN LLP

(57) ABSTRACT

A pressing device configured to press a workpiece includes a first die, a second die that moves relative to the first die, and a piston that moves the second die. The piston includes an annular pressing surface that pushes the second die.

9 Claims, 6 Drawing Sheets

(51) Int. Cl.
    *H01F 41/04*          (2006.01)
    *H01G 4/30*          (2006.01)

(56)              References Cited

U.S. PATENT DOCUMENTS

| | | |
|---|---|---|
| 5,038,669 A | 8/1991 | Maruyama |
| 2005/0089597 A1 | 4/2005 | Ito |

FOREIGN PATENT DOCUMENTS

| | | | |
|---|---|---|---|
| JP | 62-189897 U | | 12/1987 |
| JP | H01202322 A | | 8/1989 |
| JP | H01309798 A | | 12/1989 |
| JP | H04339595 A | | 11/1992 |
| JP | 2005040838 A | * | 2/2005 |
| JP | 2008012918 A | | 1/2008 |
| KR | 10-1994-0004896 | | 6/1994 |
| TW | 200818999 A | | 4/2008 |
| WO | WO-86/07563 A1 | | 12/1986 |

OTHER PUBLICATIONS

Office Action issued in KR Patent Application No. 10-2024-7004469, dated Dec. 9, 2025.

* cited by examiner

PRESSING DEVICE

TECHNICAL FIELD

The present disclosure relates to a pressing device.

BACKGROUND ART

A pressing device includes a stacking machine that manufactures a multilayer electronic component. Patent Literature 1 describes an example of a pressing device that performs a pressing operation to form a stack of resin films. In a process for manufacturing a multilayer capacitor, the pressing device is used as a stacking machine that stacks ceramic green sheets. The pressing device described above includes a piston.

CITATION LIST

Patent Literature

Patent Literature 1: Japanese Laid-Open Patent Publication No. 2008-12918

SUMMARY OF INVENTION

Technical Problem

When the trust thrust force of the piston concentrates on a central portion, the press table that is in contact with a workpiece may be bent.

It is preferred that the pressing device compression-bonds workpieces in the stacking process accurately.

Solution to Problem (1) A pressing device that solves the problem described above is configured to press a workpiece. The pressing device includes a first die, a second die that moves relative to the first die, and a piston that moves the second die. The piston includes an annular pressing surface that pushes the second die.

This structure limits concentration of thrust force of the piston on a central portion of the second die. Thus, the pressing device compression-bonds the workpiece accurately.

(2) In the pressing device described above in (1), the piston includes a tubular body. This structure limits concentration of thrust force of the piston on a central portion of the second die. When the piston includes a tubular body, the piston includes a piston inner circumferential surface and a piston outer circumferential surface. The piston is guided by the piston inner circumferential surface and the piston outer circumferential surface. This improves the accuracy of the straight movement of the piston. The improved accuracy of straight movement of the piston improves the stacking accuracy of the workpieces.

(3) The pressing device described above in (1) or (2) further includes a first additional piston that cooperates with the piston to move the second die. The piston includes a first axis and a first through hole extending in the first axis. The first additional piston includes a tubular body or a solid body. The first additional piston is arranged in the first through hole and includes a second axis that coincides with the first axis.

With this structure, pressure is appropriately applied to the workpiece by the piston and the first additional piston.

(4) In the pressing device described above in (3), one of the piston and the first additional piston is fixed to the second die. The other one of the piston and the first additional piston is movable relative to the second die.

With this structure, when the piston and the first additional piston are actuated to move the second die toward the first die, formation of air bubbles in the cylinders supporting the pistons is limited.

(5) The pressing device described above in (4) further includes a hydraulic device that moves the piston and the first additional piston independently of each other.

With this structure, the piston and the first additional piston are independently moved by the hydraulic device.

(6) The pressing device described above in (5) further includes a cylinder that supports the piston, and a first additional cylinder that supports the first additional piston. The hydraulic device includes a first hydraulic system that moves the piston in the cylinder in a first direction in which the second die approaches the first die and a second hydraulic system that moves the first additional piston in the first additional cylinder so that the second die moves in the first direction.

With this structure, the piston and the first additional piston are actuated by the different hydraulic systems.

(7) The pressing device described above in (6) further includes a biasing device that biases the piston and the first additional piston. The biasing device includes a first biasing portion that biases the piston in the cylinder in a second direction in which the second die separates away from the first die and a second biasing portion that biases the first additional piston in the first additional cylinder so that the second die moves in the second direction.

With this structure, the piston and the first additional piston are actuated by the biasing portions so that the second die moves in the second direction.

(8) The pressing device described above in (6) or (7) further includes a controller that controls the hydraulic device. The controller controls the hydraulic device so that when pressure is applied to the workpiece, a pressure application timing of one of the piston and the first additional piston differs from a pressure application timing of the other one of the piston and the first additional piston.

With this configuration, pressure is applied in different manners to the workpiece, which is pressed by the first die and the second die.

(9) The pressing device described above in (6) further includes a second additional piston that cooperates with the piston and the first additional piston to move the second die. The second additional piston includes a tubular body and includes a third axis that coincides with the first axis and the second axis and a second through hole extending in the third axis. The piston and the first additional piston are arranged in the second through hole.

With this structure, pressure is appropriately applied to the workpiece by the piston, the first additional piston, and the second additional piston.

(10) In the pressing device described above in (9), one of the piston, the first additional piston, and the second additional piston is fixed to the second die. A remaining two of the piston, the first additional piston, and the second additional piston are movable relative to the second die.

With this structure, when the piston, the first additional piston, and the second additional piston are actuated to move the second die toward the first die, formation of air bubbles in the cylinders supporting the pistons is limited.

(11) The pressing device described above in (10) further includes a controller configured to control the hydraulic device. The hydraulic device is configured to move the piston, the first additional piston, and the second additional piston independently of each other. The controller is configured to control the hydraulic device so that when pressure is applied to the workpiece, a pressure application timing of the one of the piston, the first additional piston, and the second additional piston differs from a pressure application timing of the remaining two of the piston, the first additional piston, and the second additional piston.

With this configuration, pressure is applied in different manners to the workpiece, which is pressed by the first die and the second die.

Advantageous Effects of Invention

The pressing device according to the present disclosure accurately compression-bonds workpieces.

DESCRIPTION OF EMBODIMENTS

First Embodiment

A pressing device 11 will now be described with reference to FIGS. 1 to 3.

Pressing Device

The pressing device 11 is configured to press a workpiece 21. The pressing device 11 presses workpieces 21 to compression-bond the workpieces 21. Whenever a workpiece 21 is transferred to the pressing device 11, the pressing device 11 repeats compression bonding of the workpiece 21 to form a stack of workpieces 21. The pressing device 11 is used for manufacturing various types of multilayer electronic component. For example, the pressing device 11 is used in a stacking device of a multi-layer ceramic capacitor (MLCC) stacking machine, a stacking device of a low temperature co-fired ceramics (LTCC) stacking machine, a stacking device of a lithium-ion stacking machine, a stacking device of a stacking machine for manufacturing a multilayer inductor, or a stacking device of a stacking machine for manufacturing a multilayer resistor.

Figure 1:
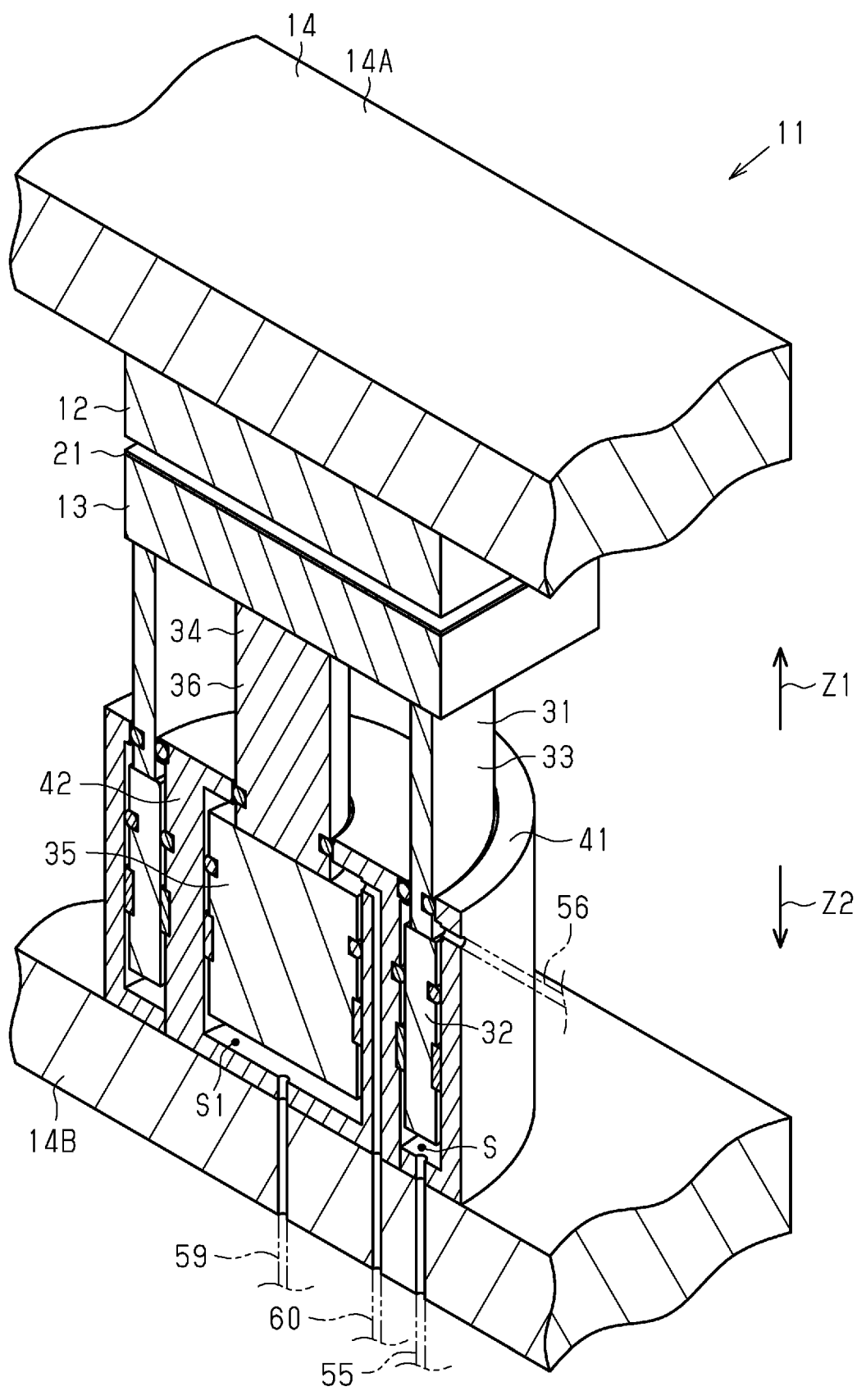
FIG. 1 is a perspective view showing a partial cross section of a first embodiment of a pressing device.
Figure 2:
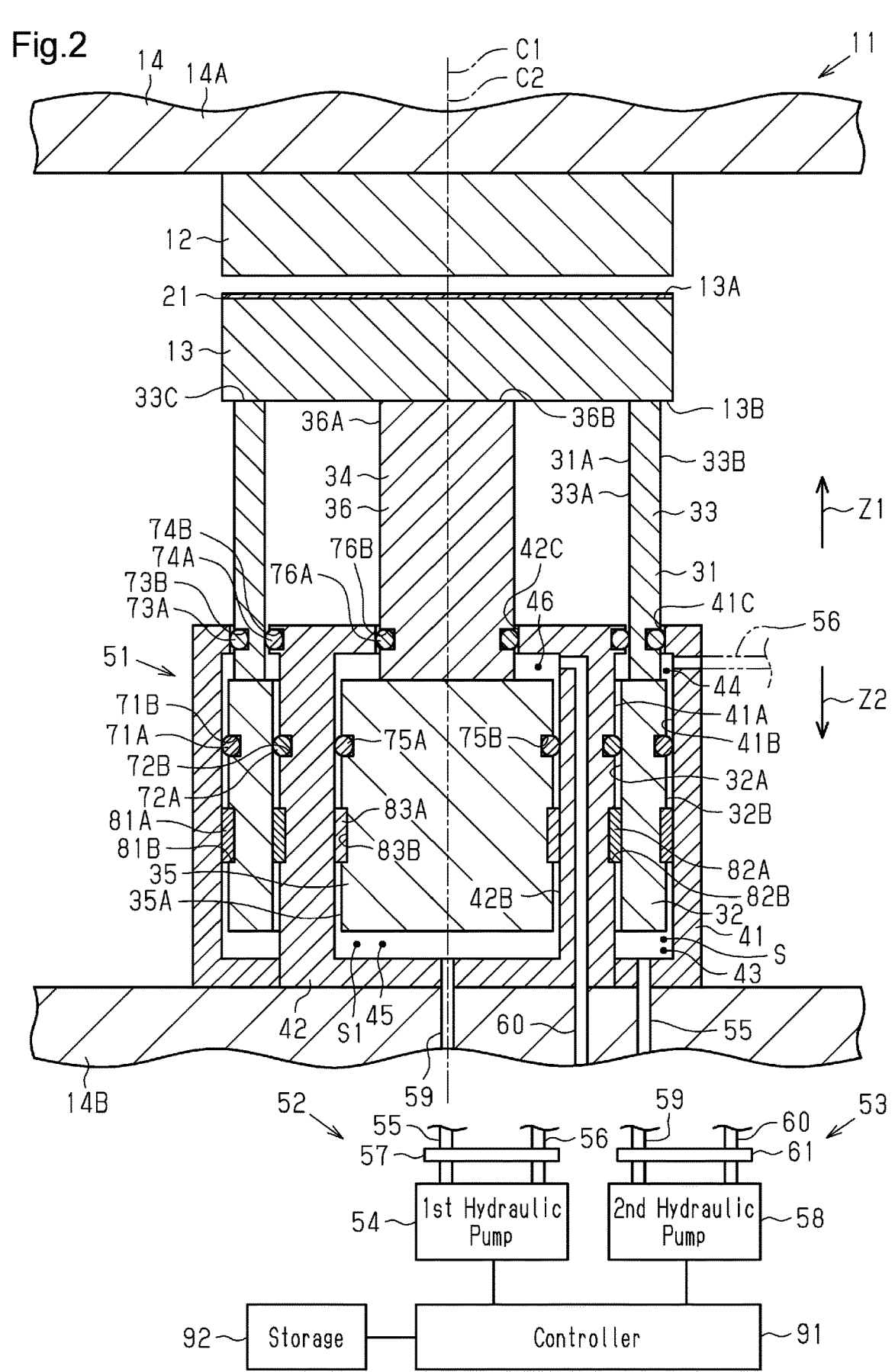
FIG. 2 is a cross-sectional view of the pressing device shown in FIG. 1.

As shown in FIGS. 1 and 2, the pressing device 11 includes a first die 12, a second die 13 that moves relative to the first die 12, and a piston 31 that moves the second die 13.

The pressing device 11 further includes a frame 14. The material of the frame 14 is metal. The frame 14 includes a first frame portion 14A and a second frame portion 14B located below the first frame portion 14A.

The first die 12 is fixed to the frame 14. The frame 14 fixes the first die 12, a cylinder 41, and a first additional cylinder 42 to maintain the positional relationship of the first die 12, the cylinder 41, and the first additional cylinder 42. The first die 12 is fixed to the first frame portion 14A or the second frame portion 14B. In an example, the first die 12 is fixed to the first frame portion 14A.

The first die 12 is shaped as a rectangular cuboid. The material of the first die 12 is metal. When the second die 13 is moved toward the first die 12, the first die 12 receives force that is applied to the first die 12.

The second die 13 is shaped as a rectangular cuboid. The material of the second die 13 is metal. When the second die 13 is pushed by the piston 31, the second die 13 moves in a first direction Z1 in which the second die 13 approaches the first die 12. When the piston 31 moves in a second direction Z2 in which the second die 13 separates away from the first die 12, the second die 13 moves in the second direction Z2.

The second die 13 includes a first surface 13A and a second surface 13B opposite to the first surface 13A in a direction in which the second die 13 moves. The workpiece 21 is mounted on the first surface 13A. The second surface 13B contacts the piston 31 and a first additional piston 34.

Workpiece

The workpiece 21 is located between the first die 12 and the second die 13 and is pressed by pressure. The workpiece 21 is a rectangular sheet. In an example, the workpiece 21 is a ceramic green sheet. The pressing device 11 sequentially stacks workpieces 21 sheet by sheet and press the workpieces 21 to from a stack.

The type and material of the workpiece 21 are not particularly limited. The workpiece 21 may be steel such as ordinary steel, special steel such as alloy steel and tool steel, non-ferrous metal such as copper and aluminum, or carbon fiber reinforced plastics (CFRP).

Piston

The piston 31 includes a tubular body. The tubular body includes a circular tubular body. In an example, the piston 31 includes a circular tubular body. The piston 31 includes one or two circular tubular bodies. The material of the piston 31 is metal. The piston 31 includes a first axis C1 and a first through hole 31A extending in the first axis C1.

The piston 31 is configured to be actuated by hydraulic pressure. Alternatively, the piston 31 may be configured to be actuated by an electric actuator.

The piston 31 includes a body 32 and a first circular tubular piston rod 33. The body 32 is shaped as a circular tube. The body 32 includes a piston inner circumferential surface 32A and a piston outer circumferential surface 32B. The piston inner circumferential surface 32A corresponds to the first through hole 31A.

The first circular tubular piston rod 33 includes a first circular tubular piston rod inner surface 33A and a first circular tubular piston rod outer surface 33B. The first circular tubular piston rod inner surface 33A corresponds to the first through hole 31A. The first circular tubular piston rod 33 is connected to an end surface of the body 32. The axis of the first circular tubular piston rod 33 coincides with the axis of the body 32. In an example, the first circular tubular piston rod 33 and the body 32 are formed integrally. The body 32 is configured to move the second die 13 relative to the first die 12 via the first circular tubular piston rod 33.

Figure 3:
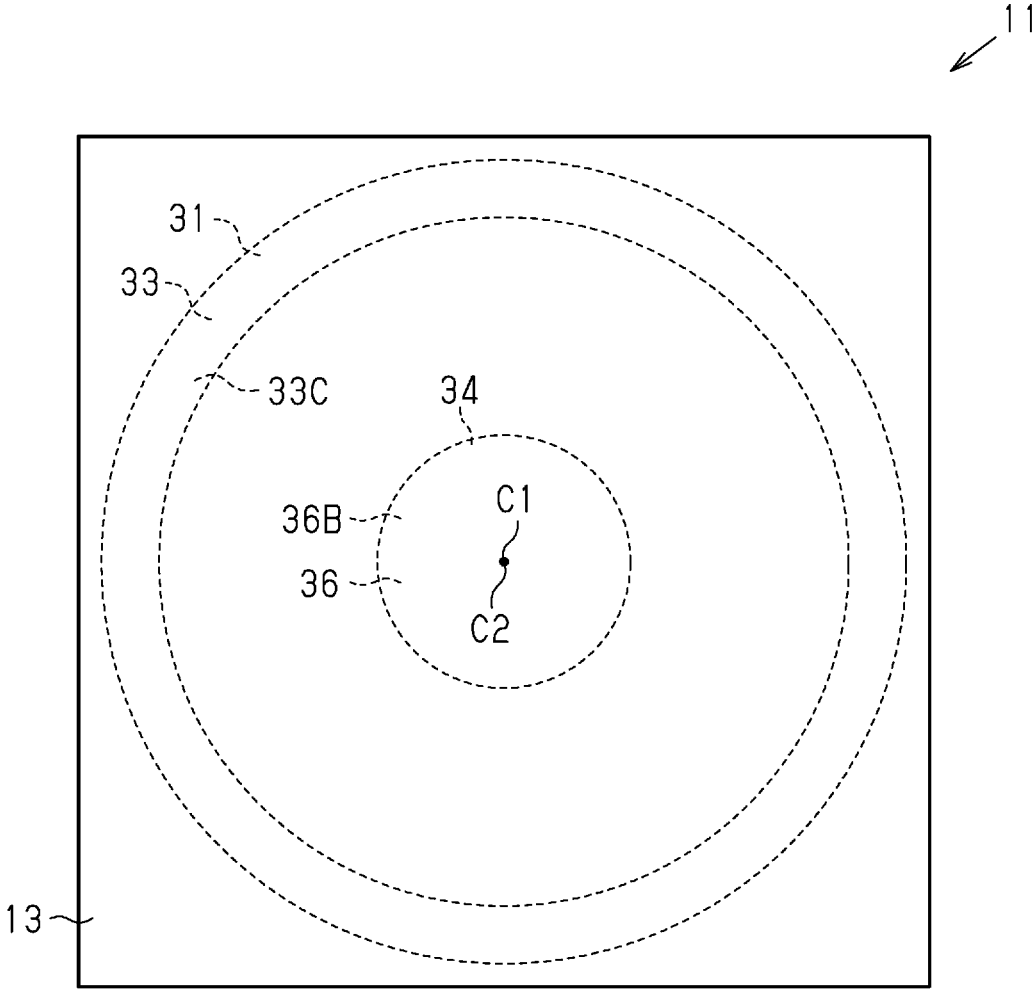
FIG. 3 is a plan view of a second die of the pressing device shown in FIG. 2.

As shown in FIGS. 2 and 3, the piston 31 includes an annular pressing surface 33C that pushes the second die 13. The pressing surface 33C is located on the first circular tubular piston rod 33. The pressing surface 33C contacts the second die 13. The pressing surface 33C is located on an end of the first circular tubular piston rod 33 opposite from the body 32.

As shown in FIGS. 1 and 2, the pressing device 11 further includes the first additional piston 34. The first additional piston 34 includes a tubular body or a solid body. The solid body includes a cylindrical solid body or a polygonal solid body. In an example, the first additional piston 34 includes a cylindrical solid body.

The material of the first additional piston 34 is metal. The first additional piston 34 includes a second axis C2 that coincides with the first axis C1. The first additional piston 34 is arranged in the first through hole 31A of the piston 31.

The first additional piston 34 cooperates with the piston 31 to move the second die 13. The first additional piston 34 is configured to be actuated by hydraulic pressure. Alternatively, the first additional piston 34 may be configured to be actuated by an electric actuator.

The first additional piston 34 includes a first additional piston body 35 and a piston rod 36. The first additional piston body 35 includes a first additional piston outer surface 35A. The piston rod 36 includes a piston rod outer surface 36A. The piston rod 36 is connected to an end surface of the first additional piston body 35. The axis of the piston rod 36 coincides with the axis of the first additional piston body 35. In an example, the piston rod 36 and the first additional piston body 35 are formed integrally. The first additional piston 34 is configured to push the second die 13 via the piston rod 36.

As shown in FIGS. 2 and 3, the first additional piston 34 includes a first additional pressing surface 36B that pushes the second die 13. The first additional pressing surface 36B is located on the piston rod 36. The first additional pressing surface 36B is in contact with the second die 13. The first additional pressing surface 36B is located on an end of the piston rod 36 opposite from the first additional piston body 35.

The first additional pressing surface 36B is in contact with a central portion of the second surface 13B of the second die 13. The pressing surface 33C, which has been described above, contacts a portion of the second surface 13B outward from the portion of the second surface 13B that is in contact with the first additional pressing surface 36B.

One of the piston 31 and the first additional piston 34 is fixed to the second die 13. More specifically, one of the pressing surface 33C of the first circular tubular piston rod 33 and the first additional pressing surface 36B of the piston rod 36 is fixed to the second die 13. In the present embodiment, the first additional piston 34 is fixed to the second die 13.

The other one of the piston 31 and the first additional piston 34 is movable relative to the second die 13. In other words, the other one of the piston 31 and the first additional piston 34 is not fixed to the second die 13. More specifically, the other one of the pressing surface 33C of the first circular tubular piston rod 33 and the first additional pressing surface 36B of the piston rod 36 is movable relative to the second die 13. In the present embodiment, the piston 31 is movable relative to the second die 13.

Cylinder

As shown in FIGS. 1 and 2, the pressing device 11 further includes the cylinder 41 supporting the piston 31 and the first additional cylinder 42 supporting the first additional piston 34.

The cylinder 41 includes a circular tubular hollow body. The material of the cylinder 41 is metal. The cylinder 41 includes an inner cavity S. The body 32 and a portion of the first circular tubular piston rod 33 are arranged in the inner cavity S of the cylinder 41.

The cylinder 41 includes a first cylinder inner circumferential surface 41A and a second cylinder inner circumferential surface 41B. The first cylinder inner circumferential surface 41A is located/inward from/at an inner side of/the second cylinder inner circumferential surface 41B.

The cylinder 41 includes a cylinder through hole 41C. The cylinder through hole 41C is annular. The first circular tubular piston rod 33 contacts the second die 13 through the cylinder through hole 41C.

The cylinder 41 includes a first pressure chamber 43. The first pressure chamber 43 is a portion of the inner cavity S. Oil is supplied to the first pressure chamber 43 from a first hydraulic pump 54 through a first port 55 or is discharged from the first pressure chamber 43. When oil is supplied to the first pressure chamber 43 and is discharged from a second pressure chamber 44, the piston 31 is actuated to move the second die 13 in the first direction Z1.

The cylinder 41 includes the second pressure chamber 44. The second pressure chamber 44 is a portion of the inner cavity S. Oil is supplied to the second pressure chamber 44 from the first hydraulic pump 54 through a second port 56 or is discharged from the second pressure chamber 44. When oil is supplied to the second pressure chamber 44 and is discharged from the first pressure chamber 43, the piston 31 is actuated to move the second die 13 in the second direction Z2.

The first additional cylinder 42 includes a hollow cylindrical body. The material of the first additional cylinder 42 is metal. The first additional cylinder 42 includes a first inner cavity S1. The first additional piston body 35 and a portion of the piston rod 36 are arranged in the first inner cavity S1 of the first additional cylinder 42. The first additional cylinder 42 includes a first additional cylinder inner circumferential surface 42B.

The first additional cylinder 42 includes a first additional cylinder through hole 42C. The first additional cylinder through hole 42C extends in an end of the first additional cylinder 42 located at the side of the second die 13 along the first additional cylinder 42. The piston rod 36 contacts the second die 13 through the first additional cylinder through hole 42C.

The first additional cylinder 42 includes a third pressure chamber 45. The third pressure chamber 45 is a portion of the first inner cavity S1. Oil is supplied to the third pressure chamber 45 from a second hydraulic pump 58 through a third port 59 or is discharged from the third pressure chamber 45. When oil is supplied to the third pressure chamber 45 and is discharged from a fourth pressure chamber 46, the first additional piston 34 is actuated to move the second die 13 in the first direction Z1.

The first additional cylinder 42 includes the fourth pressure chamber 46. The fourth pressure chamber 46 is a portion of the first inner cavity S1. Oil is supplied to the fourth pressure chamber 46 from the second hydraulic pump 58 through a fourth port 60 or is discharged from the fourth pressure chamber 46. When oil is supplied to the fourth pressure chamber 46 and is discharged from the third pressure chamber 45, the first additional piston 34 is actuated to move the second die 13 in the second direction Z2.

Hydraulic Device

As shown in FIG. 2, the pressing device 11 further includes a hydraulic device 51 that moves the piston 31 and the first additional piston 34 independently of each other.

The hydraulic device 51 includes a first hydraulic system 52 and a second hydraulic system 53. The first hydraulic system 52 moves the piston 31 in the cylinder 41 to move the second die 13 in the first direction Z1 or the second direction Z2. The first hydraulic system 52 includes the first hydraulic pump 54, the first port 55, the second port 56, and a first switch valve 57. The first hydraulic pump 54 is connected to the first pressure chamber 43 of the cylinder 41 through the first switch valve 57 and the first port 55. The first hydraulic pump 54 is connected to the second pressure chamber 44 of the cylinder 41 through the first switch valve 57 and the second port 56.

The second hydraulic system 53 moves the first additional piston 34 in the first additional cylinder 42 to move the second die 13 in the first direction Z1 or the second direction Z2. The second hydraulic system 53 includes the second hydraulic pump 58, the third port 59, the fourth port 60, and a second switch valve 61. The second hydraulic pump 58 is connected to the third pressure chamber 45 of the first additional cylinder 42 through the second switch valve 61 and the third port 59. The second hydraulic pump 58 is connected to the fourth pressure chamber 46 of the first additional cylinder 42 through the second switch valve 61 and the fourth port 60.

Seal

The pressing device 11 includes one or more first seals 71A. The first seal 71A is used to block entrance of oil into the second pressure chamber 44 of the cylinder 41 from the first pressure chamber 43 of the cylinder 41. The first seal 71A is ring-shaped. The material of the first seal 71A is synthetic resin or rubber. The first seal 71A is arranged on a first seal seat 71B. The first seal seat 71B is located on the piston outer circumferential surface 32B.

The pressing device 11 includes one or more second seals 72A. The second seal 72A, together with the first seal 71A, is used to block entrance of oil into the second pressure chamber 44 from the first pressure chamber 43. The second seal 72A is ring-shaped. The material of the second seal 72A is synthetic resin or rubber. The second seal 72A is arranged on a second seal seat 72B. The second seal seat 72B is located on the first cylinder inner circumferential surface 41A.

The pressing device 11 includes a third seal 73A. The third seal 73A is used to hamper leakage of oil from the second pressure chamber 44 through the cylinder through hole 41C when the first circular tubular piston rod 33 is actuated. The third seal 73A is ring-shaped. The material of the third seal 73A is synthetic resin or rubber. The third seal 73A is arranged on a third seal seat 73B. The third seal seat 73B is located on the first circular tubular piston rod outer surface 33B.

The pressing device 11 includes a fourth seal 74A. The fourth seal 74A, together with the third seal 73A, is used to hamper leakage of oil from the second pressure chamber 44 through the cylinder through hole 41C when the first circular tubular piston rod 33 is actuated. The fourth seal 74A is ring-shaped. The material of the fourth seal 74A is synthetic resin or rubber. The fourth seal 74A is arranged on a fourth seal seat 74B. The fourth seal seat 74B is located in the cylinder through hole 41C.

The pressing device 11 includes one or more fifth seals 75A. The fifth seal 75A is used to block entrance of oil into the fourth pressure chamber 46 of the first additional cylinder 42 from the third pressure chamber 45 of the first additional cylinder 42. The fifth seal 75A is ring-shaped. The material of the fifth seal 75A is synthetic resin or rubber. The fifth seal 75A is arranged on a fifth seal seat 75B. The fifth seal seat 75B is located on the first additional piston outer surface 35A.

The pressing device 11 includes a sixth seal 76A. The sixth seal 76A is used to hamper leakage of oil from the fourth pressure chamber 46 through the first additional cylinder through hole 42C when the piston rod 36 is actuated. The sixth seal 76A is ring-shaped. The material of the sixth seal 76A is synthetic resin or rubber. The sixth seal 76A is arranged on a sixth seal seat 76B. The sixth seal seat 76B is located on the piston rod outer surface 36A.

Wear Ring

The pressing device 11 includes one or more first wear rings 81A. The first wear ring 81A is a bushing that guides the piston 31 when actuated so that the piston 31 moves along the cylinder 41. The first wear ring 81A is circular and tubular. The material of the first wear ring 81A is synthetic resin.

The first wear ring 81A is arranged on a first wear ring seat 81B. The first wear ring seat 81B is located on the piston outer circumferential surface 32B. In an example, the first wear ring seat 81B is located on a portion of the piston outer circumferential surface 32B separated from the second die 13 further than the first seal seat 71B is. The location of the first wear ring 81A and the number of first wear rings 81A are not limited to those of this example.

The pressing device 11 includes one or more second wear rings 82A. The second wear ring 82A is a bushing that, together with the first wear ring 81A, guides the piston 31 when actuated so that the piston 31 moves along the cylinder 41. The second wear ring 82A is a ring-shaped. The material of the second wear ring 82A is synthetic resin.

The second wear ring 82A is arranged on a second wear ring seat 82B. The second wear ring seat 82B is located on the first cylinder inner circumferential surface 41A. In an example, the second wear ring seat 82B is located on a portion of the first cylinder inner circumferential surface 41A separated from the second die 13 further than the second seal seat 72B is. The location of the second wear ring 82A and the number of second wear rings 82A are not limited to those of this example.

The pressing device 11 includes one or more third wear rings 83A. The third wear ring 83A is a bushing that guides the first additional piston 34 when actuated so that the first additional piston 34 moves along the first additional cylinder 42. The third wear ring 83A is ring-shaped. The material of the third wear ring 83A is synthetic resin.

The third wear ring 83A is arranged on a third wear ring seat 83B. The third wear ring seat 83B is located on the first additional piston outer surface 35A. In an example, the third wear ring seat 83B is located on a portion of the first additional piston outer surface 35A separated from the second die 13 further than the fifth seal seat 75B is. The location of the third wear ring 83A and the number of third wear rings 83A are not limited to those of this example.

Controller

The pressing device 11 further includes a controller 91. The controller 91 includes a processor that executes predetermined control programs. The processor of the controller 91 includes, for example, a central processing unit (CPU) or a micro processing unit (MPU). The controller 91 may include multiple processors arranged at separate locations. The controller 91 can include one or more microcomputers.

The pressing device 11 further includes storage 92. In an example, the storage 92 is connected to the controller 91 through wired or wireless communication. In an example, the storage 92 stores control programs and information used for control processing.

In an example, the storage 92 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

The controller 91 controls the hydraulic device 51. When moving the second die 13 in the first direction Z1 or the second direction Z2, the controller 91 controls the hydraulic device 51 to actuate the piston 31 in the first hydraulic system 52.

When moving the second die 13 in the first direction Z1 or the second direction Z2, the controller 91 controls the hydraulic device 51 to actuate the first additional piston 34 in the second hydraulic system 53.

When moving the second die 13 in the first direction Z1, the controller 91 controls the hydraulic device 51 so that one of the piston 31 and the first additional piston 34 moves faster than the other one of the piston 31 and the first additional piston 34. In an example, when moving the second die 13 in the first direction Z1, the controller 91 controls the hydraulic device 51 so that the first additional piston 34, which is fixed to the second die 13, moves faster than the piston 31. This limits frequent occurrence of air bubble formation, which will be described later.

When moving the second die 13 in the second direction Z2, the controller 91 controls the hydraulic device 51 so that the other one of the piston 31 and the first additional piston 34 moves faster than the one of the piston 31 and the first additional piston 34. In an example, when moving the second die 13 in the second direction Z2, the controller 91 controls the hydraulic device 51 so that the piston 31, which is not fixed to the second die 13, moves faster than the first additional piston 34. This limits frequent occurrence of the air bubble formation, described later.

In addition, the controller 91 controls the hydraulic device 51 so that when pressure is applied to the workpiece 21, timing at which pressure is applied from one of the piston 31 and the first additional piston 34 differs from timing at which pressure is applied from the other one of the piston 31 and the first additional piston 34. In the present embodiment, the pressure application timing of the first additional piston 34 is earlier than the pressure application timing of the piston 31. Thus, pressure is applied to a central portion of the workpiece 21 earlier than to a surrounding portion of the central portion.

In another example, the controller 91 controls the first additional piston 34 and the piston 31 so that the pressure application timing of the first additional piston 34 is later than the pressure application timing of the piston 31 (hereafter, referred to as the specific timing control). Thus, pressure is applied to the surrounding portion of the central portion of the workpiece 21 earlier than to the central portion. The specific timing control limits sideward displacement of the workpieces 21 when the workpieces 21 are stacked. When this control is executed, it is preferred that the piston 31 is fixed to the second die 13 and the first additional piston 34 is not fixed to the second die 13 as described below in a modified example.

Operating Principle

The operating principle of the pressing device 11 when pressing the workpiece 21 will now be described.

In the first hydraulic system 52, a continuous oil supply to the first pressure chamber 43 actuates the piston 31 in the first direction Z1 at a first speed V1.

In the second hydraulic system 53, a continuous oil supply to the third pressure chamber 45 actuates the first additional piston 34 in the first direction Z1 at a second speed V2. The second speed V2 is slightly greater than the first speed V1. In other words, movement of the piston 31 is slightly retarded from movement of the first additional piston 34.

A problem that would occur if the speed of the piston 31 is greater than the speed of the first additional piston 34 will be described below. When the speed of the piston 31 is greater than the speed of the first additional piston 34, the speed of the second die 13, which is moved by thrust force of the piston 31, is greater than the speed of the first additional piston 34, which is moved based on the oil supply. However, in practice, since the first additional piston 34 is fixed to the second die 13, the first additional piston 34 and the second die 13 move at the same speed.

The speed of the first additional piston 34 that is based on the oil supply mismatches the actual speed of the first additional piston 34. More specifically, the supply of oil does not catch the speed of the first additional piston 34. As a result, air bubbles are formed in the first additional cylinder 42 (hereafter, this phenomenon is referred to as "air bubble formation"). To avoid this phenomenon, the speed (i.e., the second speed V2) of the first additional piston 34, which is fixed to the second die 13, is set to a greater value than the speed (i.e., the first speed V1) of the piston 31, which is not fixed to the second die 13.

Instead of setting the second speed V2 to be greater than the first speed V1, the following configuration may be set. The point in time for starting to move the piston 31 is set to be later than the point in time for starting to move the first additional piston 34. Also, with this configuration, movement of the piston 31 is retarded from movement of the first additional piston 34.

When the workpiece 21 comes into contact with the first die 12, the first additional piston 34 applies pressure to a central portion of the second die 13 with the first additional pressing surface 36B, and then the piston 31 applies pressure to a surrounding portion of the central portion of the second die 13 with the pressing surface 33C. Pressure is applied to both the central portion and the surrounding portion of the second surface 13B of the second die 13 by the piston 31 and the first additional piston 34. This resolves the bending of the second die 13 when the second die 13 contacts the first die 12. As a result, pressure is likely to be uniformly applied to the entire surface of the workpiece 21. Thus, the workpiece 21 is accurately compression-bonded.

Advantages of First Embodiment

The advantages of the first embodiment will now be described.

(1) The pressing device 11 is configured to press the workpiece 21. The pressing device 11 includes the first die 12, the second die 13 that moves relative to the first die 12, and the piston 31 that moves the second die 13. The piston 31 includes the annular pressing surface 33C that pushes the second die 13.

As in the prior art, when a central portion of the second die 13 is pushed by a single piston 31, the pressure applied to the central portion of the second die 13 slightly bends the second die 13. In this case, the pressure applied to the workpiece 21 differs between the central portion of the workpiece 21 and the surrounding portion of the central portion. When pressure gradient occurs from the central portion toward the surrounding portion, the central portion of the workpiece 21 and the peripheral portion of the workpiece 21 may vary in quality. In addition, when the piston 31 presses the central portion of the second die 13 and the pressing direction of the piston 31 is inclined with respect to the second die 13, a portion of the pressing force acts in the horizontal direction. This may result in sideward displacement of the workpieces 21 when the workpieces 21 are stacked. The sideward displacement of the workpieces 21 that occurs during manufacturing of a stack of the workpieces 21 greatly affects the yield of the workpieces 21. Such a problem becomes more prominent when the second die 13 is enlarged.

In this regard, the configuration described above limits concentration of thrust force of the piston 31 on the central portion of the second die 13. Thus, the pressing device 11 accurately compression-bonds the workpieces 21.

(2) The piston 31 includes a tubular body. This structure limits concentration of thrust force of the piston 31 on the central portion of the second die 13. When the piston 31 includes a tubular body, the piston 31 includes the piston inner circumferential surface 32A and the piston outer circumferential surface 32B. The piston 31 is guided by the piston inner circumferential surface 32A and the piston outer circumferential surface 32B. This improves the accuracy of straight movement of the piston 31. The improved accuracy of straight movement of the piston 31 improves the stacking accuracy of the workpieces 21.

(3) The piston 31 includes the first axis C1 and the first through hole 31A extending in the first axis C1. The first additional piston 34 is further included and cooperates with the piston 31 to move the second die 13. The first additional piston 34 includes a tubular body or a solid body. The first additional piston 34 is arranged in the first through hole 31A and includes the second axis C2 that coincides with the first axis C1.

With this structure, pressure is appropriately applied to the workpiece 21 by the piston 31 and the first additional piston 34.

(4) One of the piston 31 and the first additional piston 34 is fixed to the second die 13. The other one of the piston 31 and the first additional piston 34 is movable relative to the second die 13.

When the second die 13 is moved by multiple pistons, the pistons may be fixed to the second die 13. In this case, each of the pistons needs to be moved by a hydraulic pump with high accuracy. If timings of moving the pistons are misaligned or one of the pistons moves faster than the remaining pistons, a phenomenon caused by asynchronous movement of the pistons (hereafter, referred to as asynchronous phenomenon) may result in formation of air bubbles in a cylinder (hereafter, referred to as air bubble formation). The air bubbles formed in the cylinder hamper application of hydraulic pressure to the pistons and interfere with movement of the second die 13. The asynchronous phenomenon occurs when multiple pistons are fixed to a single die and actuated without satisfactory synchronization of the pistons. When multiple pistons are fixed to a single die (hereafter, referred to as multiple piston fixed state), the pistons are constrained together by the single die. Thus, the pistons move the same distance in accordance with movement of the die. In other words, at any time from when the pistons start to move, the pistons move an equal amount.

When hydraulic control for synchronizing multiple pistons is executed, the amount of oil supplied to the cylinders or the amount of oil discharged from the cylinders may vary unless the control is highly accurate. As a result, in one or some of the pistons, the amount of oil supplied to the cylinder supporting the piston may mismatch the amount of movement of the piston. Such mismatching results in formation of air bubbles in the cylinder. As described above, the air bubbles formed in the cylinder hamper application of sufficient hydraulic pressure to the piston.

In the structure described above, the piston 31 and the first additional piston 34 move independently of each other. Therefore, when the piston 31 and the first additional piston 34 are actuated to move the second die 13 toward the first die 12, formation of air bubbles in the cylinder 41 supporting the piston 31 is limited.

(5) The hydraulic device 51 is further included to move the piston 31 and the first additional piston 34 independently of each other.

With this structure, the piston 31 and the first additional piston 34 are independently moved by the hydraulic device 51.

(6) The cylinder 41, supporting the piston 31, and the first additional cylinder 42, supporting the first additional piston 34, are further included. The hydraulic device 51 includes the first hydraulic system 52 that moves the piston 31 in the cylinder 41 in the first direction Z1, in which the second die 13 approaches the first die 12, and the second hydraulic system 53 that moves the first additional piston 34 in the first additional cylinder 42 so that the second die 13 moves in the first direction Z1.

With this structure, the piston 31 and the first additional piston 34 are actuated by the different hydraulic systems.

(7) The controller 91 is further included to control the hydraulic device 51. The controller 91 controls the hydraulic device 51 so that when pressure is applied to the workpiece 21, timing at which pressure is applied from one of the piston 31 and the first additional piston 34 differs from timing at which pressure is applied from the other one of the piston 31 and the first additional piston 34.

With this configuration, pressure is applied in different manners to the workpiece 21, which is pressed by the first die 12 and the second die 13. In an example, the hydraulic device 51 is controlled to apply pressure to the workpiece 21 in a manner such that pressure is applied to the central portion of the workpiece 21 and then to the peripheral portion of the workpiece 21. Alternatively, pressure may be applied to the workpiece 21 in a manner such that pressure is applied to the peripheral portion of the workpiece 21 and then to the central portion of the workpiece 21.

Second Embodiment

A second embodiment of the pressing device 11 will now be described with reference to FIGS. 4 and 5. In the second embodiment, the differences from the first embodiment will be described. The same reference names are given to those members that are the same as the corresponding members of the first embodiment. Such members will not be described in detail.

Second Additional Piston

In the second embodiment, the pressing device 11 further includes a second additional piston 37 in addition to the piston 31 and the first additional piston 34. The second additional piston 37 includes a tubular body. In an example, the second additional piston 37 includes a circular tubular body. The material of the second additional piston 37 is metal.

The second additional piston 37 includes a third axis C3 and a second through hole 37A extending in the third axis C3. The third axis C3 coincides with the first axis C1 and the second axis C2. The piston 31 and the first additional piston 34 are arranged in the second through hole 37A of the second additional piston 37.

The second additional piston 37 cooperates with the piston 31 and the first additional piston 34 to move the second die 13. The second additional piston 37 is configured to be actuated by hydraulic pressure. The second additional piston 37 may be configured to be actuated by an electric actuator.

The second additional piston 37 includes a second additional piston body 38 and a second circular tubular piston rod 39. The second additional piston body 38 includes a second additional piston inner circumferential surface 38A and a second additional piston outer circumferential surface 38B. The second additional piston inner circumferential surface 38A corresponds to the second through hole 37A.

The second circular tubular piston rod 39 includes a second circular tubular piston rod inner surface 39A and a second circular tubular piston rod outer surface 39B. The second circular tubular piston rod inner surface 39A corresponds to the second through hole 37A. The second additional piston body 38 is configured to move the second die 13 relative to the first die 12 via the second circular tubular piston rod 39.

Figure 4:
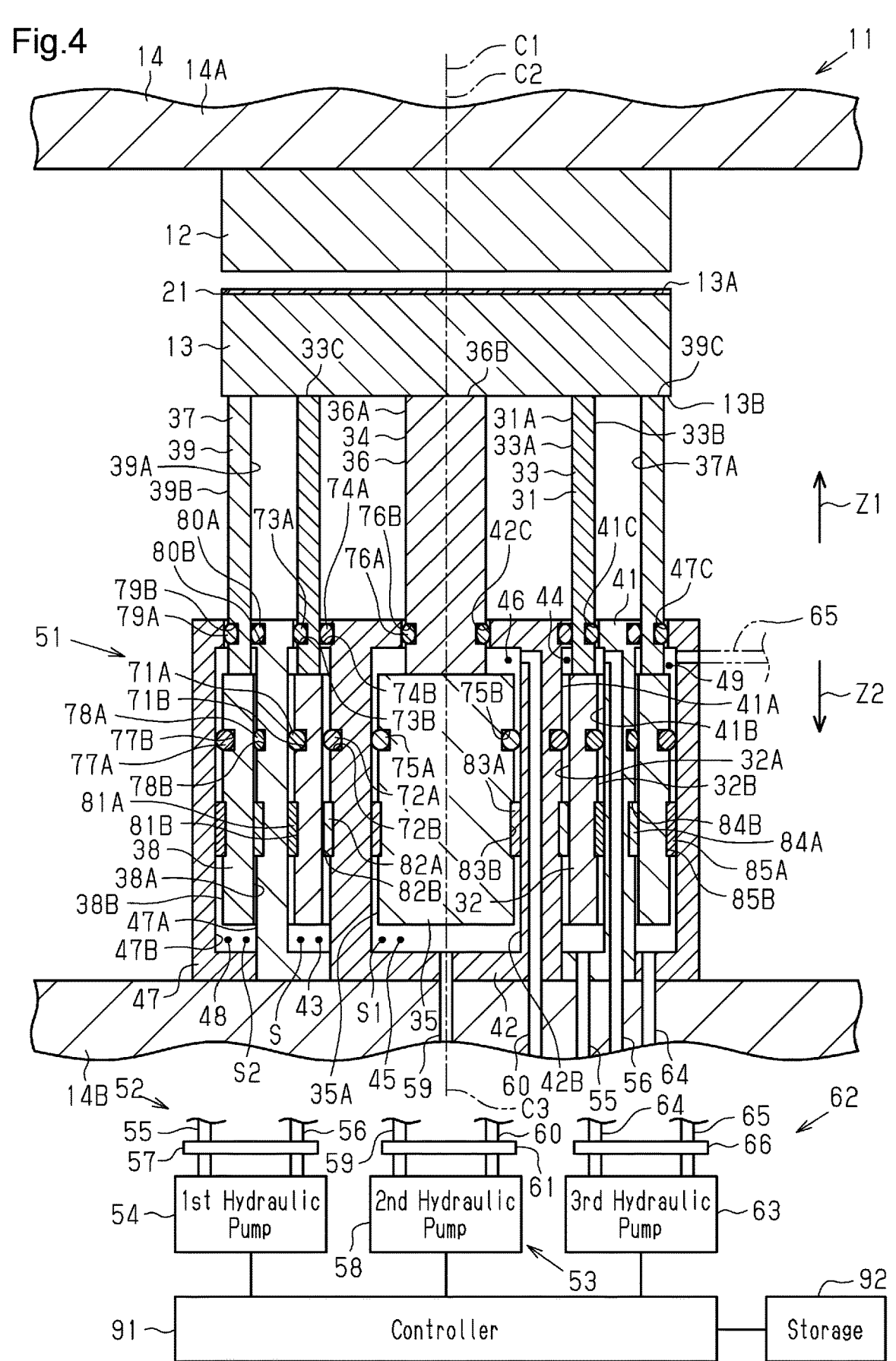
FIG. 4 is a cross-sectional view showing a second embodiment of a pressing device.
Figure 5:
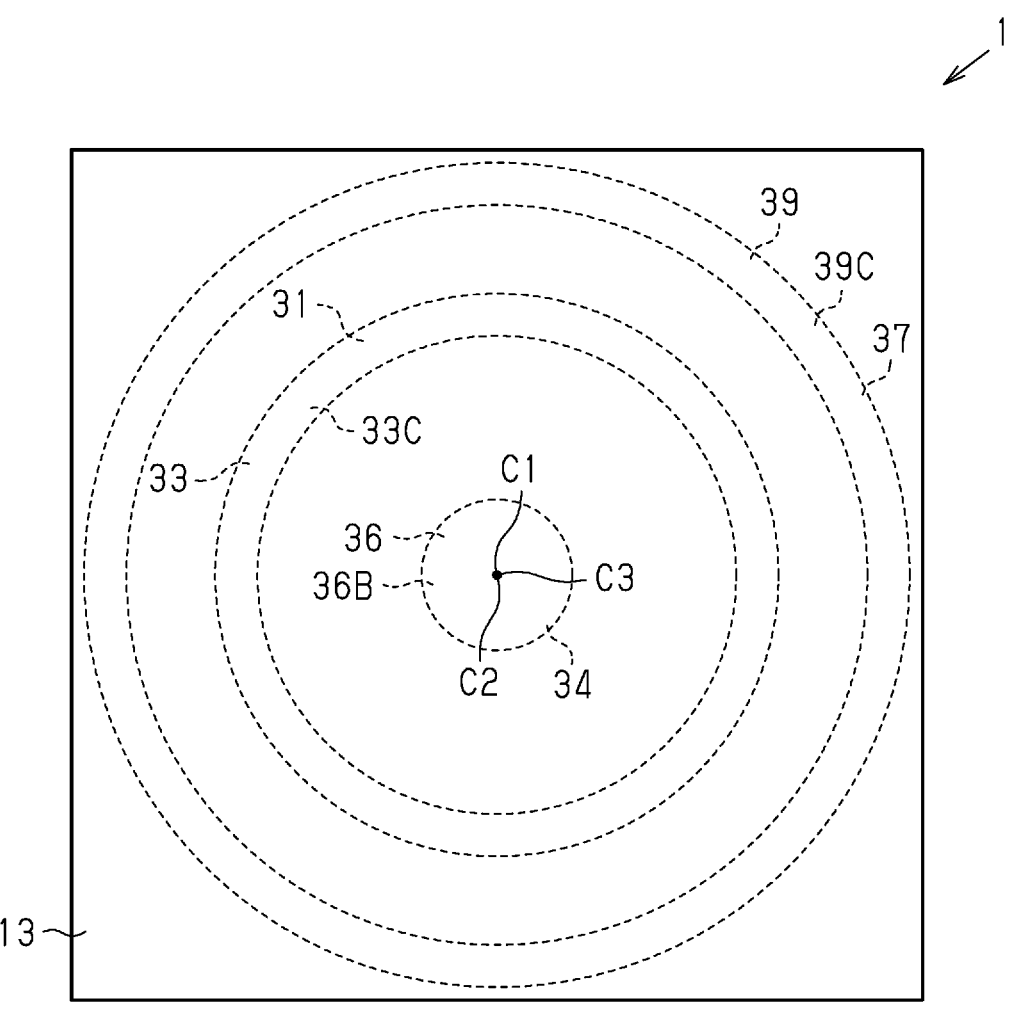
FIG. 5 is a plan view of a second die of the pressing device shown in FIG. 4.

As shown in FIGS. 4 and 5, the second additional piston 37 includes a second additional pressing surface 39C that pushes the second die 13. The second additional pressing surface 39C is located on the second circular tubular piston rod 39. The second additional pressing surface 39C contacts the second die 13. The second additional pressing surface 39C is located on an end of the second circular tubular piston rod 39 opposite from the second additional piston body 38. The second additional pressing surface 39C contacts a portion of the second surface 13B of the second die 13 outward from the pressing surface 33C.

One of the piston 31, the first additional piston 34, and the second additional piston 37 is fixed to the second die 13. More specifically, one of the pressing surface 33C of the first circular tubular piston rod 33, the first additional pressing surface 36B of the piston rod 36, and the second additional pressing surface 39C of the second circular tubular piston rod 39 is fixed to the second die 13. In the present embodiment, the first additional piston 34 is fixed to the second die 13.

The remaining two of the piston 31, the first additional piston 34, and the second additional piston 37 are movable relative to the second die 13. In other words, the remaining two of the piston 31, the first additional piston 34, and the second additional piston 37 are not fixed to the second die 13. More specifically, the remaining two of the pressing surface 33C of the first circular tubular piston rod 33, the first additional pressing surface 36B of the piston rod 36, and the second additional pressing surface 39C of the second circular tubular piston rod 39 are movable relative to the second die 13. In the present embodiment, the piston 31 and the second additional piston 37 are movable relative to the second die 13.

Second Additional Cylinder

In the second embodiment, the pressing device 11 further includes a second additional cylinder 47 in addition to the cylinder 41 and the first additional cylinder 42. The second additional cylinder 47 includes a hollow circular tubular body. The material of the second additional cylinder 47 is metal. The second additional cylinder 47 includes a second inner cavity S2. The second additional piston body 38 and a portion of the second circular tubular piston rod 39 are arranged in the second inner cavity S2 of the second additional cylinder 47.

The second additional cylinder 47 includes a first inner circumferential surface 47A and a second inner circumferential surface 47B. The first inner circumferential surface 47A is located at the side of the cylinder 41 in the second additional cylinder 47. The second inner circumferential surface 47B is located at an outer side of the first inner circumferential surface 47A in a radial direction that is perpendicular to the third axis C3.

The second additional cylinder 47 includes a second additional cylinder through hole 47C. The second additional cylinder through hole 47C is annular. The second circular tubular piston rod 39 contacts the second die 13 through the second additional cylinder through hole 47C.

The second additional cylinder 47 includes a fifth pressure chamber 48. The fifth pressure chamber 48 is a portion of the second inner cavity S2. Oil is supplied to the fifth pressure chamber 48 from a third hydraulic pump 63 through a fifth port 64 or is discharged from the third pressure chamber 45. When oil is supplied to the fifth pressure chamber 48 and is discharged from a sixth pressure chamber 49, the second additional piston 37 is actuated to move the second die 13 in the first direction Z1.

The second additional cylinder 47 includes the sixth pressure chamber 49. The sixth pressure chamber 49 is a portion of the second inner cavity S2. Oil is supplied to the sixth pressure chamber 49 from the third hydraulic pump 63 through a sixth port 65 or discharged from the sixth pressure chamber 49. When oil is supplied to the sixth pressure chamber 49 and is discharged from the fifth pressure chamber 48, the second additional piston 37 is actuated to move the second die 13 in the second direction Z2.

Hydraulic Device

In the second embodiment, the hydraulic device 51 is configured to move the piston 31, the first additional piston 34, and the second additional piston 37 independently of each other.

The hydraulic device 51 includes a third hydraulic system 62 in addition to the first hydraulic system 52 and the second hydraulic system 53. The third hydraulic system 62 moves the second additional piston 37 in the second additional cylinder 47 to move the second die 13 in the first direction Z1 or the second direction Z2. The third hydraulic system 62 includes the third hydraulic pump 63, the fifth port 64, the sixth port 65, and a third switch valve 66. The third hydraulic pump 63 is connected to the fifth pressure chamber 48 of the second additional cylinder 47 through the third switch valve 66 and the fifth port 64. The third hydraulic pump 63 is connected to the sixth pressure chamber 49 of the second additional cylinder 47 through the third switch valve 66 and the sixth port 65.

Seal

The pressing device 11 includes one or more seventh seals 77A. The seventh seal 77A is used to block entrance of oil into the sixth pressure chamber 49 from the fifth pressure chamber 48. The seventh seal 77A is ring-shaped. The material of the seventh seal 77A is synthetic resin or rubber. The seventh seal 77A is arranged on a seventh seal seat 77B. The seventh seal seat 77B is located on the second additional piston outer circumferential surface 38B.

The pressing device 11 includes one or more eighth seals 78A. The eighth seal 78A, together with the seventh seal 77A, is used to block entrance of oil into the sixth pressure chamber 49 from the fifth pressure chamber 48. The eighth seal 78A is ring-shaped. The material of the eighth seal 78A is synthetic resin or rubber. The eighth seal 78A is arranged on an eighth seal seat 78B. The eighth seal seat 78B is located on the first inner circumferential surface 47A.

The pressing device 11 includes a ninth seal 79A. The ninth seal 79A is used to hamper leakage of oil from the sixth pressure chamber 49 through the second additional cylinder through hole 47C when the second circular tubular piston rod 39 is actuated. The ninth seal 79A is ring-shaped. The material of the ninth seal 79A is synthetic resin or rubber. The ninth seal 79A is arranged on a ninth seal seat 79B. The ninth seal seat 79B is located on the second circular tubular piston rod outer surface 39B.

The pressing device 11 includes a tenth seal 80A. The tenth seal 80A, together with the ninth seal 79A, is used to hamper leakage of oil from the sixth pressure chamber 49 through the second additional cylinder through hole 47C when the second circular tubular piston rod 39 is actuated. The tenth seal 80A is ring-shaped. The material of the tenth seal 80A is synthetic resin or rubber. The tenth seal 80A is arranged on a tenth seal seat 80B. The tenth seal seat 80B is located in the second additional cylinder through hole 47C.

Wear Ring

The pressing device 11 includes one or more fourth wear rings 84A. The fourth wear ring 84A is a bushing that guides the second additional piston 37 when actuated so that the second additional piston 37 moves along the second additional cylinder 47. The fourth wear ring 84A is circular and tubular. The material of the fourth wear ring 84A is synthetic resin. The fourth wear ring 84A is arranged on a fourth wear ring seat 84B. The fourth wear ring seat 84B is located on the first inner circumferential surface 47A. In an example, the fourth wear ring seat 84B is located on a portion of the first inner circumferential surface 47A separated from the second die 13 further than the eighth seal seat 78B is. The location of the fourth wear ring 84A and the number of fourth wear rings 84A are not limited to those of this example.

The pressing device 11 includes one or more fifth wear rings 85A. The fifth wear ring 85A is a bushing that guides, together with the fourth wear ring 84A, the second additional piston 37 when actuated so that the second additional piston 37 moves along the second additional cylinder 47. The fifth wear ring 85A is circular and tubular. The material of the fifth wear ring 85A is synthetic resin. The fifth wear ring 85A is arranged on a fifth wear ring seat 85B. The fifth wear ring seat 85B is located on the second additional piston outer circumferential surface 38B. In an example, the fifth wear ring seat 85B is located on a portion of the second additional piston outer circumferential surface 38B separated from the second die 13 further than the seventh seal seat 77B is. The location of the fifth wear ring 85A and the number of fifth wear rings 85A are not limited to those of this example.

Controller

In the same manner as the first embodiment, the controller 91 controls the hydraulic device 51 so that the piston 31 is actuated by the first hydraulic system 52. In the same manner as the first embodiment, the controller 91 controls the hydraulic device 51 so that the first additional piston 34 is actuated by the second hydraulic system 53. The controller 91 controls the hydraulic device 51 so that the second additional piston 37 is actuated by the third hydraulic system 62.

When moving the second die 13 in the first direction Z1, the controller 91 is configured to control the hydraulic device 51 so that one of the piston 31, the first additional piston 34, and the second additional piston 37 moves faster than the remaining two of the piston 31, the first additional piston 34, and the second additional piston 37. In the present embodiment, when moving the second die 13 in the first direction Z1, the controller 91 controls the hydraulic device 51 so that the first additional piston 34, which is fixed to the second die 13, moves faster than the piston 31 and the second additional piston 37. This limits frequent occurrence of the air bubble formation, described above.

When moving the second die 13 in the second direction Z2, the controller 91 controls the hydraulic device 51 so that two of the piston 31, the first additional piston 34, and the second additional piston 37 move faster than the remaining one of the piston 31, the first additional piston 34, and the second additional piston 37. In the present embodiment, when moving the second die 13 in the second direction Z2, the controller 91 controls the hydraulic device 51 so that the piston 31 and the second additional piston 37, which are not fixed to the second die 13, move faster than the first additional piston 34. This limits frequent occurrence of the air bubble formation, described above.

In the pressing device 11 of the second embodiment, the piston 31, the first additional piston 34, and the second additional piston 37 apply pressure to the two positions, that is, the central portion and the outer side, of the second surface 13B of the second die 13. This resolves the bending of the second die 13 when the second die 13 contacts the first die 12. As a result, pressure is likely to be uniformly applied to the entire surface of the workpiece 21. Thus, the workpiece 21 is accurately compression-bonded.

Advantages of Second Embodiment

The advantage of the second embodiment will now be described.

(1) In addition to the piston 31 and the first additional piston 34, the pressing device 11 further includes the second additional piston 37 that cooperates with the piston 31 and the first additional piston 34 to move the second die 13. The second additional piston 37 includes a tubular body and includes the third axis C3 coinciding with the first axis C1 and the second axis C2 and the second through hole 37A extending in the third axis C3. The piston 31 and the first additional piston 34 are arranged in the second through hole 37A.

With this structure, pressure is appropriately applied to the workpiece 21 by the piston 31, the first additional piston 34, and the second additional piston 37.

(2) One of the piston 31, the first additional piston 34, and the second additional piston 37 is fixed to the second die 13. The remaining two of the piston 31, the first additional piston 34, and the second additional piston 37 are movable relative to the second die 13.

With this structure, when the piston 31, the first additional piston 34, and the second additional piston 37 are actuated to move the second die 13 toward the first die 12, formation of air bubbles in the cylinders 41, 42, and 47 supporting the pistons 31, 34, and 37 is limited.

(3) The hydraulic device 51 is configured to move the piston 31, the first additional piston 34, and the second additional piston 37 independently of each other. The hydraulic device 51 further includes the controller 91 configured to control the hydraulic device 51. The controller 91 controls the hydraulic device 51 so that when pressure is applied to the workpiece 21, timing at which pressure is applied from one of the piston 31, the first additional piston 34, and the second additional piston 37 differs from timing at which pressure is applied from the remaining two of the piston 31, the first additional piston 34, and the second additional piston 37.

With this configuration, pressure is applied in different manners to the workpiece 21, which is pressed by the first die 12 and the second die 13.

Third Embodiment

Figure 6:
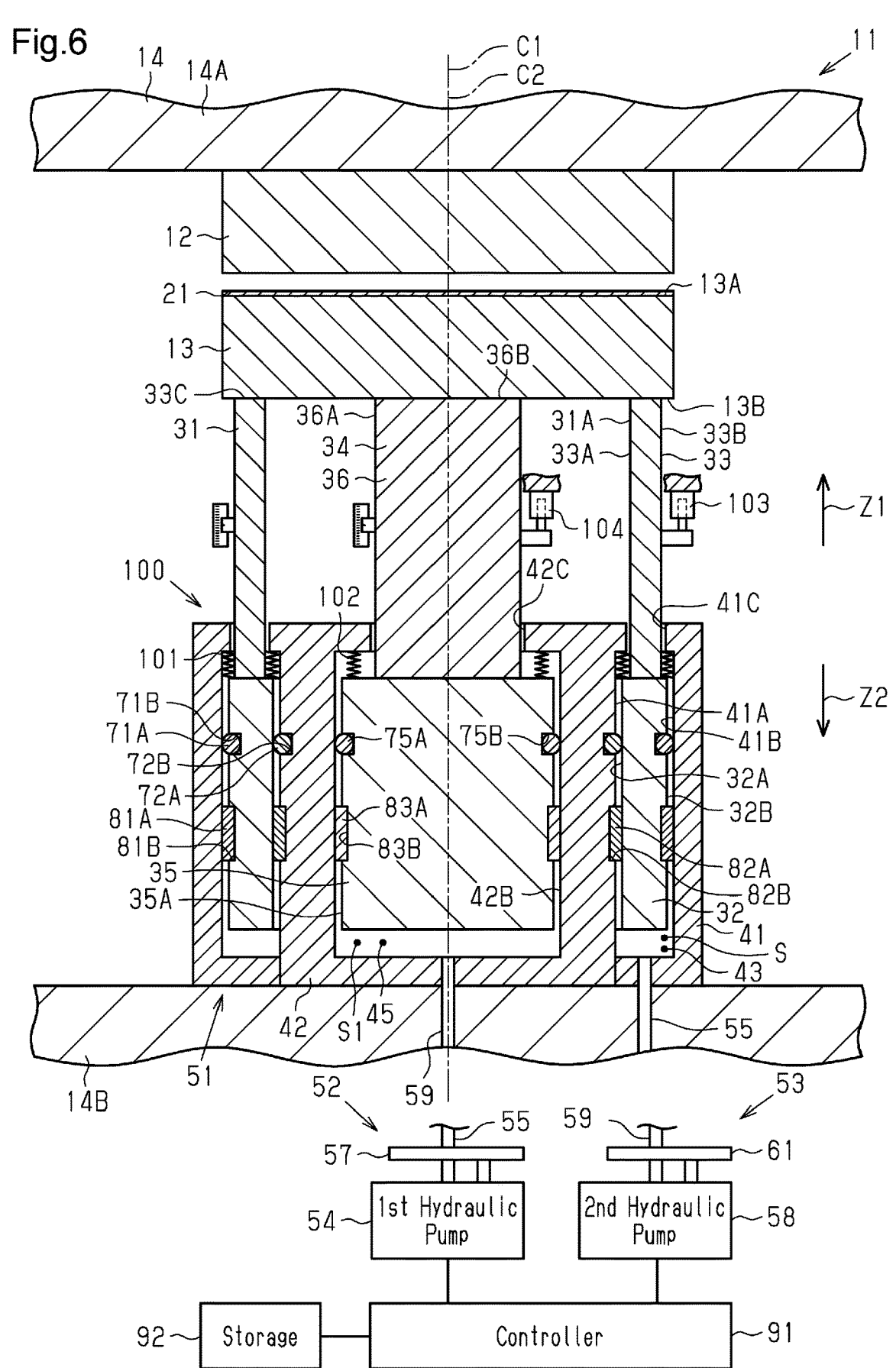
FIG. 6 is a cross-sectional view showing a third embodiment of a pressing device.

A third embodiment of a pressing device 11 will now be described with reference to FIG. 6. In the third embodiment, the differences from the first embodiment will be described. The same reference names are given to those members that are the same as the corresponding members of the first embodiment. Such members will not be described in detail.
Biasing Device As shown in FIG. 6, the pressing device 11 further includes a biasing device 100. The biasing device 100 biases the piston 31 and the first additional piston 34.

The biasing device 100 includes a first biasing portion 101 and a second biasing portion 102. The first biasing portion 101 is a metal spring, a rubber spring, an air spring, or a liquid spring. The first biasing portion 101 is arranged in the inner cavity S. The first biasing portion 101 is arranged between the piston 31 and the cylinder 41. The first biasing portion 101 biases the piston 31 so that the second die 13 moves in the second direction Z2, in which the second die 13 separates away from the first die 12. More specifically, the first biasing portion 101 is arranged at a portion corresponding to the second pressure chamber 44 of the first embodiment.

The second biasing portion 102 is a metal spring, a rubber spring, an air spring, or a liquid spring. The second biasing portion 102 is arranged in the first inner cavity S1. The second biasing portion 102 is arranged between the first additional piston 34 and the first additional cylinder 42. The second biasing portion 102 biases the first additional piston 34 so that the second die 13 moves in the second direction Z2 in which the second die 13 separates away from the first die 12. More specifically, the second biasing portion 102 is arranged at a portion corresponding to the fourth pressure chamber 46 of the first embodiment.

The biasing device 100 may further include a first actuator 103 and a second actuator 104. The first actuator 103 is an air actuator, an electric actuator, or a hydraulic actuator. The first actuator 103 is located on the first circular tubular piston rod 33. Together with the first biasing portion 101, the first actuator 103 biases the piston 31 so that the second die 13 moves in the second direction Z2 in which the second die 13 separates away from the first die 12.

The second actuator 104 is an air actuator, an electric actuator, or a hydraulic actuator. The second actuator 104 is located on the piston rod 36. Together with the second biasing portion 102, the second actuator 104 biases the first additional piston 34 so that the second die 13 moves in the second direction Z2 in which the second die 13 separates away from the first die 12.

The biasing device 100 may further include a linear scale or a linear encoder for the piston 31. The biasing device 100 may include a linear scale or a linear encoder for the first additional piston 34.

Advantage of Third Embodiment

The advantages of the third embodiment will now be described.

(1) The biasing device 100 is further included and biases the piston 31 and the first additional piston 34. The biasing device 100 includes the first biasing portion 101 that biases the piston 31 in the cylinder 41 in the second direction Z2, in which the second die 13 separates away from the first die 12, and the second biasing portion 102 that biases the first additional piston 34 in the first additional cylinder 42 so that the second die 13 moves in the second direction Z2.

With this structure, the piston 31 and the first additional piston 34 are actuated by the biasing portions so that the second die 13 moves in the second direction Z2. In addition, when the first biasing portion 101 and the second biasing portion 102 are highly elastic, the speed at which the dies open is improved.

Modified Examples

In addition to the embodiments described above, the pressing device according to the present disclosure is applicable to modified examples that are described below and combinations of at least two of the modified examples that do not contradict each other.

In the first embodiment, the first additional piston 34 is fixed to the second die 13, and the piston 31 is movable relative to the second die 13. Alternatively, the first additional piston 34 may be movable relative to the second die 13, and the piston 31 may be fixed to the second die 13. In this case, when moving in the first direction Z1, the piston 31, which is fixed to the second die 13, is controlled to move at an earlier timing than the first additional piston 34, which is movable relative to the second die 13. Thus, pressure is applied to the peripheral portion of the workpiece 21 earlier than to the central portion of the workpiece 21. In addition, frequent occurrence of the air bubble formation is limited. When moving in the second direction Z2, the first additional piston 34, which is movable relative to the second die 13, is controlled to move at an earlier timing than the piston 31, which is fixed to the second die 13. This limits frequent occurrence of the air bubble formation.

In the first embodiment, the piston 31 and the first additional piston 34 do not necessarily have to be fixed to the second die 13. In this case, it is preferred that the second die 13 is biased toward the piston 31 and the first additional piston 34 by a predetermined force. With this structure, even when variations occur in actuations of the piston 31 and the first additional piston 34, the air bubble formation is limited.

In the second embodiment, among the piston 31, the first additional piston 34, and the second additional piston 37, only the first additional piston 34 is fixed to the second die 13. Alternatively, only the second additional piston 37 may be fixed to the second die 13. In this case, when moving in the first direction Z1, the second additional piston 37, which is fixed to the second die 13, is controlled to move at an earlier timing than the piston 31 and the first additional piston 34, which are movable relative to the second die 13. In addition, when moving in the first direction Z1, the piston 31 is controlled to move at an earlier timing than the first additional piston 34. As described above, when the pistons are moved in order from the outer side, namely, in order of the second additional piston 37, the piston 31, and the first additional piston 34, pressure is sequentially applied from the periphery of the workpiece 21 toward the central portion of the workpiece 21.

The second embodiment may be controlled as follows. When moving in the first direction Z1, the first additional piston 34, which is fixed to the second die 13, is controlled to move at an earlier timing than the piston 31 and the second additional piston 37, which are movable relative to the second die 13. In addition, when moving in the first direction Z1, the piston 31 is controlled to move at an earlier timing than the second additional piston 37. As described above, when the pistons are moved in order from the inner side, namely, in order of the first additional piston 34, the piston 31, and the second additional piston 37, pressure is sequentially applied from the central portion of the workpiece 21 toward the periphery of the workpiece 21.

In the second embodiment, all of the piston 31, the first additional piston 34, and the second additional piston 37 do not necessarily have to be fixed to the second die 13. In this case, it is preferred that the second die 13 is biased toward the piston 31, the first additional piston 34, and the second additional piston 37 by a predetermined force. With this structure, even when variations occur in actuations of the piston 31, the first additional piston 34, and the second additional piston 37, the air bubble formation is limited.

The number of pistons in the pressing device 11 is not limited. The pressing device 11 may include three or more tubular pistons having a common axis. The pressing device 11 may include three or more tubular pistons and a solid cylindrical piston that have a common axis.

In the first embodiment, the first speed V1 may be equal to the second speed V2. When the first speed V1 is equal to the second speed V2, the controller 91 controls the hydraulic device 51 so that one of the piston 31 and the first additional piston 34 that is fixed to the second die 13 is moved ahead of the other one of the piston 31 and the first additional piston 34.

The ports 55, 56, 59, 60, 64, and 65 may each be connected to a different hydraulic pump or may be connected to the same hydraulic pump.

In each of the embodiments, the type of the hydraulic device 51 is not limited. The hydraulic device 51 may be a servo-controlled pump device. The servo-controlled pump device controls a flow rate and a flow direction using a servomotor. The servo-controlled pump device controls movement of a piston with high accuracy. The servo-controlled pump device can switch the direction in which oil flows by switching the rotational direction of the motor between forward and reverse. This dispenses with a switch valve. When the servo-controlled pump device controls the switching of the oil flow direction based on the switching of the rotational direction of the motor between forward and reverse, movement of the second die 13 is smoothly switched from the first direction Z1 to the second direction Z2.

This specification discloses the following techniques.
[Clause 1]

Clause 1 is a technique related to a pressing device. The pressing device includes a first die, a second die that moves relative to the first die, and a piston that moves the second die. The piston includes an annular pressing surface that pushes the second die. The piston includes a tubular body. The piston includes a first axis and a first through hole extending in the first axis. A first additional piston is further included and cooperates with the piston to move the second die. The first additional piston includes a tubular body or a solid body, and the first additional piston is arranged in the first through hole and includes a second axis that coincides with the first axis. The piston and the first additional piston are not fixed to the second die and are movable relative to the second die.
[Clause 2]

In Clause 1, a hydraulic device is further included and moves the piston and the first additional piston independently of each other.

The description related to the above embodiments exemplifies, without any intention to limit, applicable forms of a pressing device according to the present disclosure. The pressing device according to the present disclosure may be applicable to forms differing from the above embodiments.

REFERENCE SIGNS LIST

11) pressing device, 12) first die, 13) second die, 21) workpiece, 31) piston, 31A) first through hole, 33C) pressing surface, 34) first additional piston, 37) second additional piston, 37A) second through hole, 41) cylinder, 42) first additional cylinder, 51) hydraulic device, 52) first hydraulic system, 53) second hydraulic system, 91) controller, 100) biasing device, 101) first biasing portion, 102) second biasing portion, C1) first axis, C2) second axis, C3) third axis, Z1) first direction, Z2) second direction

The invention claimed is:

1. A pressing device configured to press a workpiece, the pressing device comprising:
   a first die;
   a second die that moves relative to the first die;
   a piston including a tubular body, the piston being configured to move the second die; and
   a first additional piston including a tubular body or a solid body, the first additional piston being configured to cooperate with the piston to move the second die,
   wherein the piston includes a first axis and a circular tubular piston rod, the circular tubular piston rod including an annular pressing surface that pushes the second die,
   an inner surface of the circular tubular piston rod defines a first through hole extending in the first axis,
   the first additional piston includes a second axis that coincides with the first axis and a first additional pressing surface that is in contact with and pushes the second die, and
   the first additional piston is arranged in the first through hole.

2. The pressing device according to claim 1, wherein one of the piston and the first additional piston is fixed to the second die, and the other one of the piston and the first additional piston is movable relative to the second die.

3. The pressing device according to claim 2, further comprising:
   a hydraulic device that moves the piston and the first additional piston independently of each other.

4. The pressing device according to claim 3, further comprising:
   a cylinder that supports the piston; and
   a first additional cylinder that supports the first additional piston, wherein the hydraulic device includes a first hydraulic system that moves the piston in the cylinder in a first direction in which the second die approaches the first die and a second hydraulic system that moves the first additional piston in the first additional cylinder so that the second die moves in the first direction.

5. The pressing device according to claim 4, further comprising:

a biasing device that biases the piston and the first additional piston, wherein the biasing device includes a first biasing portion that biases the piston in the cylinder in a second direction in which the second die separates away from the first die and a second biasing portion that biases the first additional piston in the first additional cylinder so that the second die moves in the second direction.

6. The pressing device according to claim 4, further comprising:

a controller that controls the hydraulic device, wherein the controller controls the hydraulic device so that when pressure is applied to the workpiece, a pressure application timing of one of the piston and the first additional piston differs from a pressure application timing of the other one of the piston and the first additional piston.

7. The pressing device according to claim 4, further comprising:

a second additional piston that cooperates with the piston and the first additional piston to move the second die, wherein the second additional piston includes a tubular body and includes a third axis that coincides with the first axis and the second axis and a second through hole extending in the third axis, and the piston and the first additional piston are arranged in the second through hole.

8. The pressing device according to claim 7, wherein one of the piston, the first additional piston, and the second additional piston is fixed to the second die, and a remaining two of the piston, the first additional piston, and the second additional piston are movable relative to the second die.

9. The pressing device according to claim 8, further comprising:

a controller configured to control the hydraulic device, wherein the hydraulic device is configured to move the piston, the first additional piston, and the second additional piston independently of each other, and the controller is configured to control the hydraulic device so that when pressure is applied to the workpiece, a pressure application timing of the one of the piston, the first additional piston, and the second additional piston differs from a pressure application timing of the remaining two of the piston, the first additional piston, and the second additional piston.

* * * * *